United States Patent [19]

Locatelli et al.

[11] Patent Number: 4,518,754
[45] Date of Patent: May 21, 1985

[54] IMIDO COPOLYMERS

[75] Inventors: Jean L. Locatelli, Vienne; Bernard Rollet, Lyons, both of France

[73] Assignee: Rhone-Poulenc Industries, Paris, France

[21] Appl. No.: 43,812

[22] Filed: May 30, 1979

[30] Foreign Application Priority Data

May 30, 1978 [FR] France ............................... 78 16013

[51] Int. Cl.³ ............................................. C08F 22/40
[52] U.S. Cl. ..................................... 526/262; 548/521
[58] Field of Search .................. 526/262; 260/326.26; 548/521

[56] References Cited

U.S. PATENT DOCUMENTS

| | | | |
|---|---|---|---|
| 2,890,206 | 6/1959 | Kraiman | 526/262 |
| 2,890,207 | 6/1959 | Kraiman | 526/262 |
| 2,971,944 | 2/1961 | Chow et al. | 260/326.26 |
| 3,018,290 | 1/1962 | Sauers et al. | 260/326.2 |
| 3,334,071 | 8/1967 | Reeder | 526/262 |
| 3,435,003 | 3/1969 | Craven | 526/262 |
| 3,562,223 | 2/1971 | Bargain et al. | 526/262 |
| 3,627,780 | 12/1971 | Bonnard et al. | 526/262 |
| 3,651,012 | 3/1972 | Holub et al. | 526/262 |
| 3,669,930 | 6/1972 | Asahara et al. | 526/262 |
| 3,679,639 | 7/1972 | Bargain et al. | 526/262 |
| 3,712,933 | 1/1973 | Decloux et al. | 260/326.26 |
| 3,887,582 | 6/1975 | Holub et al. | 260/326.26 |
| 3,890,272 | 6/1975 | D'Alelio | 526/262 |
| 3,900,449 | 8/1975 | Rembold et al. | 526/262 |
| 3,928,286 | 12/1975 | Akiyama et al. | 526/262 |
| 4,035,345 | 7/1977 | Ducloux et al. | 526/262 |
| 4,043,986 | 8/1977 | Gruffay et al. | 260/326.26 |
| 4,118,377 | 10/1978 | D'Alelio | 526/262 |
| 4,160,859 | 7/1979 | Renner et al. | 528/322 |

FOREIGN PATENT DOCUMENTS

| | | | |
|---|---|---|---|
| 599560 | 6/1960 | France | 526/262 |
| 1137592 | 12/1969 | United Kingdom . | |

Primary Examiner—Paul M. Coughlan, Jr.
Attorney, Agent, or Firm—Burns, Doane, Swecker & Mathis

[57] ABSTRACT

Novel imido copolymers are prepared by copolymerizing:

[i] a bis-maleimide of the structural formula:

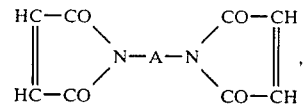

[ii] an olefinically unsaturated comonomer copolymerizable therewith.

The subject copolymers are applicable to the production of a variety of useful shaped articles, coatings, laminates, foams, and the like.

32 Claims, No Drawings

IMIDO COPOLYMERS

BACKGROUND OF THE INVENTION

1. Field of the Invention

The present invention relates to novel thermosetting polymers comprising imide functions, and, more especially, to the copolymerization products of a bis-imide with an olefinically unsaturated comonomer.

2. Description of the Prior Art

It is known to this art that heat resistant polyimide resins may be obtained by simple heating of the bis-imides of unsaturated carboxylic acids. Shaped articles molded from such resins, however, are fragile because of their high degree of cross-linking. The reduction of the cross-linking density by means of an addition reaction between the bis-imide and a diamine [U.S. Pat. No. 3,562,223 and see French Pat. No. 1,555,564] or a polyamine-monoamine mixture [see U.S. Pat. No. 3,669,930] has been suggested. These molded shaped articles have been found useful in applications requiring high temperature strength. Nonetheless, in numerous applications which do not require a high thermal index, the difficulty in processing these resins is a pronounced obstacle to their use and development.

SUMMARY OF THE INVENTION

It is the major object of the present invention to provide novel polymers comprising imide groups which are more easily processed than related polymers known to the art. The polymers of the present invention are processed without solvents, by simple hot casting, and, after hardening or curing, yield products having superior mechanical properties. Prior to hardening, the polymers of the present invention are in the form of fluid resins of low viscosity at moderate temperatures, and are thus easily processed. For this reason, they are particularly suitable for molding by simple hot casting and by impregnation techniques. Polymers of the present invention may be used after cooling and grinding, in the form of powders which are remarkably well suited for compression molding, and may be used in association with fibrous or power fillers. The polymers may also be used for the preparation of coatings, for adhesive bonding, in laminated materials which may have a skeleton of mineral, vegetable or synthetic fibers, and for cellular materials or foams, following incorporation of a pore-forming agent therein. Further, the polymers of the present invention may also be used as an impregnating varnish and as an enamel, both without solvent.

The polymers of the present invention are prepared by copolymerization between:

[i] a bis-maleimide of the structural formula:

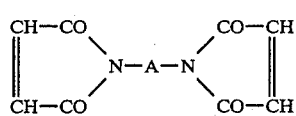 (I)

wherein A is a divalent radical, preferably selected from the group comprising phenylene and radicals of the structural formula:

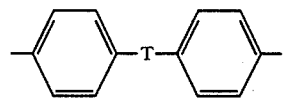 (II)

wherein T is a divalent radical, preferably selected from the group comprising —CH$_2$—, —C(CH$_3$)$_2$—, —O— and —SO$_2$—; and

[ii] an olefinically unsaturated comonomer copolymerizable therewith, and having a degree of reactivity such that the resonance parameter value Q of the comonomer ranges from 0.01 to 0.7 and the polarity parameter value e [hereinafter referred to simply as "e"] thereof is less than or equal to 0.

DETAILED DESCRIPTION OF THE INVENTION

The bis-maleimides of structural formula (I) are known to the art. Same may be prepared by the methods disclosed in U.S. Pat. No. 3,018,290 and British Pat. No. 1,137,592 which are hereby expressly incorporated by reference and relied upon. The following are representative examples of such bis-maleimides:

N,N'-metaphenylene bis-maleimide,
N,N',4,4'-diphenylether bis-maleimide,
N,N',4,4'-diphenyl-2,2-propyl bis-maleimide,
N,N',4,4'-diphenylsulfone bis-maleimide, and
N,N',4,4'-diphenylmethane bis-maleimide.

The latter bis-maleimide is preferentially utilized in consonance with the present invention.

A mixture comprising a bis-maleimide of structural formula (I) and a mono-imide, wherein the number of imide groups of the mono-imide is up to 30% of the total number of imide groups in the mixture, may also be used in the present invention.

The olefinically unsaturated comonomers [ii] which are copolymerized according to the invention and which display the aforenoted values of the parameters e and Q, comprise at least one polymerizable moiety reflecting the structural formula:

$$-CH=C- \quad (III)$$

The parameters e and Q are defined in the literature, for example, in the *Encyclopedia of Polymer Science and Technology*, Vol. 4, pp. 192ff, which is hereby expressly incorporated by reference. The values of e and Q for a given comonomer may be calculated in a practical manner by carrying out partial copolymerization of the comonomer with a reference monomer such as styrene. The copolymer obtained is analyzed to determine the ratios of reactivity related to e and Q by the Alfrey-Price equation:

The olefinically unsaturated comonomers which are copolymerized according to the present invention comprise ethers, sulfides, esters, hydrocarbons, and substituted heterocyclic compounds. Same may also be halo-substituted, and preferably halo-substituted with chlorine and fluorine atoms.

Exemplary of the immediately foregoing comonomers are vinyl derivatives of ethers and sulfides, such as divinyl ether, n-butylvinyl ether, isobutylvinyl ether, ethylvinyl ether, divinyl sulfide, ethylvinyl sulfide, and methylvinyl sulfide.

Also exemplary are such esters as the allyl, 1-chloroallyl, crotyl and isopropenyl esters of the aliphatic or aromatic monocarboxylic or polycarboxylic acids. Suitable carboxylic acids include formic, acetic, propionic, butyric, caproic, malonic and benzoic acids. Specific esters which are within the ambit of the present invention are vinyl acetate, vinyl formate, vinyl chloroacetate, vinyl dichloroacetate, methallyl acetate, isopropenyl acetate, vinyl benzoate, ethylvinyl oxalate, and dimethallyl oxalate.

Ethylenically and acetylenically unsaturated hydrocarbons, and the ethylenically unsaturated cycloaliphatic hydrocarbons are also within the ambit of the invention. Exemplary of such hydrocarbons are ethylene, propylene, isobutylene, oligobutene, pentene, hexene, indene, stilbene, vinylacetylene, phenylacetylene, naphthyleneacetylene, norborene, vinylnorborene, vinylcyclohexene, and dicyclopentadiene.

The substituted heterocyclic compounds which too can be copolymerized according to the present invention preferably comprise N-vinyl derivatives of heterocyclic compounds such as N-vinylcarbazol, N-vinylcaprolactam, and N-vinyl-2-oxazolidinone.

The olefinically unsaturated comonomers [ii] can also bear such hydroxy substituents as alcoholic or phenolic hydroxy groups, ketone or aldehyde carboxyl functions, or amido groups. Thus, the unsaturated comonomer may be an alcohol, a phenol, an amide, an aldehyde or a ketone. Examples of monomers bearing such substituents are N-allyl acrylamide, benzalacetone, and allyl alcohol.

And admixtures of more than one of the abovementioned monomers may also be utilized in the present invention.

In order to prepare the polymers of the present invention, the amounts of the various reactants are selected such that the ratio of the number of imide groups comprising the bis-maleimide [i] to the number of molecules of the olefinically unsaturated comonomer [ii] is from 0.3 to 5, and preferably from 0.5 to 3.

The reaction temperature may vary over wide limits, as a function of the nature and of the proportions of the reactants. However, typically the temperature ranges from 50° to 250° C.

The polymers of the present invention can be prepared via bulk polymerization whereby the mixture of the unsaturated comonomer [ii] and the bis-maleimide [i] is heated until a homogeneous liquid results. To obtain a homogeneous liquid composition it is typically not necessary to exceed a temperature of 160° C. Prior to heating the mixture of the reactants, it is advantageous to effect preliminary homogenization. It may be possible to first melt one of the two reactants and then mix the melt with the other reactant.

The polymers of the present invention may also be prepared by heating a mixture of the reactants in an inert organic diluent which is liquid over at least part of the temperature range of the reaction. Suitable as diluents are dioxane, acetone, N-methylpyrrolidone, dimethylformamide, dimethylacetamide, and chlorobenzene.

Solutions or suspensions of the polymers of the invention may be utilized for a wealth of applications. It is also possible to isolate the polymers of the present invention from any such solution or suspension. For example, the polymers may be isolated by precipitation by means of an organic reagent which is miscible with the solvent used. Suitable hydrocarbon solvents have boiling points not substantially in excess of 120° C. However, in the majority of cases it is not necessary to add such diluents because the initial mixtures are sufficiently fluid at moderate temperatures.

The polymers of the present invention may be prepared in the presence of a free-radical inhibitor, such as phenothiazine or any one of those noted at Encyclopedia of Polymer Science and Technology, Vo. 7, pages 644 to 662, which is hereby incorporated by reference.

The polymers of the present invention may be hardened or cured [thermoset] polymers, which are insoluble in conventional solvents and which do not exhibit appreciable softening below the temperature at which softening begins. However, the polymers may also be prepared in the form of prepolymers which are indeed soluble in polar organic solvents and which have a softening point at a temperature below 250° C. These prepolymers may be prepared in bulk by heating the mixture of reactants until a homogeneous or viscous product is obtained, typically at a temperature of from 50° to 180° C. The preparation of these prepolymers may also be carried out in suspension, or in solution, in an organic diluent which is a liquid over at least part of the temperature range of from 50° to 180° C., and preferably the reaction is carried out in a polar organic solvent.

In a second stage, whereby the polymer is obtained from the prepolymer, the resins may be hardened or cured by heating to a temperature up to the order of 300° C., and usually from 100° to 200° C. Optionally, such heating may be preceded by addition of a catalyst, such as a peroxide, to the reaction mix. As another option, an additional shaping operation may be performed upon the reaction mass during the hardening thereof. This shaping operation may be conducted under pressure in excess of atmospheric, or under vacuum. These operations may also be carried out consecutively.

The polymers of the present invention may also comprise an aromatic compound having from 2 to 4 benezene rings, which does not sublime at temperatures less than 250° C. under atmospheric pressure and which has a boiling point in excess of 250° C. The addition of such aromatic compounds is of particular interest in connection with the aforenoted prepolymers, because same typically contribute to a reduction in softening point. Suitable aromatic compounds are described in U.S. Pat. No. 3,679,639 and French Pat. No. 2,046,025, which is hereby incorporated by reference.

The polymers of the present invention may also be modified prior to hardening with an unsaturated polyester. Suitable unsaturated polyester polymers are described in U.S. Pat. No. 3,679,639 and French Pat. No. 2,102,796, which is also hereby incorporated by reference.

In order to further illustrate the present invention and the advantages thereof, the following specific examples are given, it being understood that same are intended only as illustrative and in nowise limitative.

EXAMPLES 1 TO 6

A cylindrical reactor was equipped with means for agitation and was placed in a bath maintained at 140° C.

by a thermostat. Quantities of bis-maleimide and unsaturated comonomer, as well as 0.1 gram of tetrachloroparabenzoquinone were introduced into the reactor. The mixture was agitated for 15 minutes which resulted in a clear solution. The solution was degassed under vacuum (200 mm Hg) for 2 minutes, and was then cast in a rectangular mold (127×75×4 mm) which had been preheated to 150° C. The mold assembly was maintained for 4 hours at 150° C., and then for 24 hours at 200° C. A homogeneous cast article of excellent quality was thereby obtained.

Table I reflects the reactants, the amounts of reactants used, the viscosity of the molten mass obtained after degassing, and the gelling time for each of Examples 1 to 6.

Table II reflects the mechanical properties of the cast articles obtained in Examples 1 to 6. The bending strength and the flexural modulus were measured using ASTM Standard D 790-63 with a distance between supports of 25.4 mm.

TABLE I

| EXAMPLE NO. | BIS-MALEIMIDE Type | Weight (in g.) | MONOMER Type | Weight (in g.) | VISCOSITY (IN POISE) at 80° C. | at 110° C. | at 130° C. | GELLING TIME (in minutes) at 130° C. | at 150° C. |
|---|---|---|---|---|---|---|---|---|---|
| 1 | DPBM* | 76.4 | indene | 23.6 |  | 3.2 | 0.5 | 25 | 6 |
| 2 | DPBM | 62.0 | indene | 38.0 | 5 |  | 0.3 | 13.5 | 5.5 |
| 3 | DPBM | 57.5 | vinyl-caprolactam | 42.5 |  | 28 | 0.5 | 10.5 | 5.8 |
| 4 | DPBM | 73.0 | vinyl-caprolactam | 27.0 |  | 26 | 3.5 | 7.5 | 6 |
| 5 | DPBM | 55.3 | naphtylene-acetylene | 44.7 |  |  |  | 25 | 6 |
| 6 | DPBM | 77.0 | naphtylene-acetylene | 29.0 |  |  |  | 25 | 22 |

*DPBM = N,N',4,4'-diphenylmethanebismaleimide

TABLE II

| EXAMPLE NO. | BENDING STRENGTH (in kg/mm$^2$) at 25° C. | at 200° C. | FLEXURAL MODULUS (in kg/mm$^2$) at 25° C. | at 200° C. |
|---|---|---|---|---|
| 1 | 9.9 | 5.9 | 307 | 174 |
| 2 | 10.0 | 6.1 | 266 | 167 |
| 3 | 13.4 | 1.3 | 203 | 90 |
| 4 | 16.0 |  | 241 |  |
| 5 | 8.5 |  | 190 |  |
| 6 | 9.8 |  | 257 |  |

EXAMPLE 7

The above described procedure was repeated using 56 g of N,N'4,4'-diphenylmethane bis-maleimide and 44 g of 4-phenyl-3-butene-2-one (benzalacetone). The homogeneous cast article obtained had a bending strength of 5.6 kg/mm$^2$ at 20° C. and a flexural modulus of 119 kg/mm$^2$.

EXAMPLE 8

The procedure of Example 7 was carried out using 72 g of the same bis-maleimide and 25 g of the same comonomer. The homogeneous cast article obtained had a bending strength of 6.9 kg/mm$^2$ and a flexural modulus of 245 kg/mm$^2$.

EXAMPLE 9

The procedure described in the preceding examples was repeated until 74 g of N,N',4,4'-diphenylmethane bis-maleimide and 26 g of dicyclopentadiene as the reactants; however, the initial homogenizing temperature was 150° C., and the curing was carried out at 150° C. for 22 hours. A homogeneous and translucent cast article was thereby obtained.

EXAMPLE 10

The procedure described in Example 1 was repeated using 80 g of N,N',4,4'-diphenylmethane bis-maleimide and 20 g of vinylcarbazol. The homogeneous cast article obtained had a bending strength of 8.7 kg/mm$^2$ at 25° C. and of 2.9 kg/m$^2$ at 200° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An imido copolymer consisting essentially of the reaction product of copolymerization between (i) a bis-maleimide having the structural formula (I):

(I)

wherein A is phenylene or a divalent radical having the structural formula (II):

(II)

in which T is —CH$_2$—, —C(CH$_3$)$_2$—, —O— or —SO$_2$—; and (ii) an olefinically unsaturated comonomer copolymerizable therewith, said comonomer (ii) displaying a degree of reactivity such that its resonance Q ranges from 0.01 to 0.7 and its polarity e is 0 or less and with the ratio of the number of imide functions to the number of molecules of the olefinically unsaturated comonomers (ii) ranging from 0.3 to 5.

2. The copolymer as defined by claim 1, wherein the bis-maleimide (i) is selected from the group comprising N,N'-metaphenylene bis-maleimide, N,N',4,4'-diphenylether bis-maleimide, N,N',4,4'-diphenyl-2,2-propyl bis maleimide, N,N',4,4'-diphenylsulfone bis-maleimide and N,N',4,4'-diphenylmethane bis-maleimide.

3. The copolymer as defined by claim 2, wherein the bis-maleimide (i) is N,N',4,4'-diphenylmethane bis-maleimide.

4. The copolymer as defined by claim 1, the bis-maleimide (i) being in admixture with a mono-imide, the number of imide functions in said mono-imide being up to 30% of the total number of imide functions in said admixture.

5. The copolymer as defined by claim 1, said olefinically unsaturated comonomer (ii) being a member selected from the group consisting of an unsaturated ether, sulfide, ester, hydrocarbon, heterocycle and halo-derivative thereof.

6. The copolymer as defined by claim 5, said olefinically unsaturated comonomer (ii) being a vinyl ether.

7. The copolymer as defined by claim 6, said vinyl ether being selected from the group consisting of divinyl ether, n-butylvinyl ether and isobutylvinyl ether.

8. The copolymer as defined by claim 5, said olefinically unsaturated comonomer (ii) being a vinyl sulfide.

9. The copolymer as defined by claim 8, said vinyl sulfide being selected from the group consisting of divinyl sulfide, ethylvinyl sulfide and methylvinyl sulfide.

10. The copolymer as defined by claim 5, said olefinically unsaturated comonomer (ii) being an unsaturated ester of an aliphatic or aromatic monocarboxylic or polycarboxylic acid.

11. The copolymer as defined by claim 10, said carboxylic acid being selected from the group consisting of formic, acetic, propionic, butyric, caproic, malonic, oxalic and benzoic.

12. The copolymer as defined by claim 11, said unsaturated ester being selected from the group consisting of vinyl acetate, vinyl formate, vinyl chloroacetate, vinyl dichloroacetate, methallyl acetate, isopropenyl acetate, vinyl benzoate, ethylvinyl oxalate and dimethallyl oxalate.

13. The copolymer as defined by claim 5, said olefinically unsaturated comonomer (ii) being an ethylenically or acetylenically unsaturated hydrocarbon.

14. The copolymer as defined by claim 13, said hydrocarbon being selected from the group consisting of ethylene, isobutylene, oligobutene, pentene, hexene, indene, stilbene, vinylacetylene, phenylacetylene, naphthyleneacetylene, norborene, vinylnorborene, vinylcyclohexene and dicyclopentadiene.

15. The copolymer as defined by claim 5, said olefinically unsaturated comonomer (ii) being an N-vinyl heterocycle.

16. The copolymer as defined by claim 15, said N-vinyl heterocycle being selected from the group consisting of N-vinylcarbazol, N-vinylcaprolactam and N-vinyl-2-oxazolidine.

17. The copolymer as defined by claim 1, said ratio ranging from 0.5 to 3.

18. The copolymer as defined by claims 1 or 5, the same being a thermoset copolymer.

19. A shaped article comprising the copolymer as defined by claim 18.

20. A process for preparing the copolymer as defined by claim 1, comprising heating said comonomers (i) and (ii) to a temperature of from 50° to 250° C.

21. The process as defined by claim 20, comprising bulk copolymerizing said comonomers until a homogeneous liquid results.

22. The process as defined by claim 21, said heating being at a temperature not in excess of 160° C.

23. The process as defined by claim 20, said comonomers being admixed with an inert organic diluent.

24. The process as defined by claim 20, further comprising heating the copolymer resulting therefrom to hardening temperatures.

25. The process as defined by claim 20, wherein said comonomers are homogenized prior to heating.

26. The process as defined by claim 20, comprising a solution copolymerization.

27. The process as defined by claim 20, comprising a suspension copolymerization.

28. The process as defined by claim 20, wherein the heating of the comonomers (i) and (ii) is conducted in the presence of a free radical catalyst.

29. The process as defined by claim 20, wherein the heating of the comonomers (i) and (ii) is conducted in the presence of a copolymerization catalyst.

30. A coating composition comprising the copolymer as defined by claims 1 or 5.

31. An adhesive composition comprising the copolymer as defined by claims 1 or 5.

32. An imido copolymer, comprising the reaction product of copolymerization obtained upon reacting the monomers consisting essentially of (i) a bis-maleimide having the structural formula (I):

$$\begin{array}{c} HC-CO \\ \| \\ HC-CO \end{array} \!\!\!\! \diagdown \!\!\! \begin{array}{c} \\ N-A-N \\ \end{array} \!\!\! \diagup \!\!\!\! \begin{array}{c} CO-CH \\ \| \\ CO-CH \end{array} \quad (I)$$

wherein A is phenylene or a divalent radical having the structural formula (II):

$$-\!\!\!\left\langle\!\!\!\bigcirc\!\!\!\right\rangle\!\!\!-T-\!\!\!\left\langle\!\!\!\bigcirc\!\!\!\right\rangle\!\!\!- \quad (II)$$

in which T is $-CH_2-$, $-C(CH_3)_2-$, $-O-$ or $-SO_2$; and (ii) an olefinically unsaturated comonomer copolymerizable therewith, said comonomer (ii) displaying a degree of reactivity such that its resonance Q ranges from 0.01 to 0.7 and its polarity e is 0 or less, and with the ratio of the number of imide functions to the number of molecules of the olefinically unsaturated comonomer (ii) ranging from 0.3 to 5.

* * * * *